United States Patent
Larson

(10) Patent No.: US 8,791,859 B2
(45) Date of Patent: Jul. 29, 2014

(54) HIGH PRECISION RADIO FREQUENCY DIRECTION FINDING SYSTEM

(75) Inventor: Clayton J. Larson, Acton, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 335 days.

(21) Appl. No.: 13/298,260

(22) Filed: Nov. 16, 2011

(65) Prior Publication Data
US 2013/0120192 A1    May 16, 2013

(51) Int. Cl.
*G01S 1/08*    (2006.01)
*G01S 5/04*    (2006.01)

(52) U.S. Cl.
USPC ............................ 342/386; 342/442; 342/444

(58) Field of Classification Search
USPC .......... 342/386, 417, 442, 444, 445; 367/125, 367/128
See application file for complete search history.

(56) References Cited

U.S. PATENT DOCUMENTS

| | | | | |
|---|---|---|---|---|
| 4,962,458 A | * | 10/1990 | Verstraete | 701/533 |
| 5,568,154 A | * | 10/1996 | Cohen | 342/443 |
| 6,525,685 B1 | * | 2/2003 | Rose | 342/148 |
| 2006/0114157 A1 | * | 6/2006 | Kolanek et al. | 342/424 |

* cited by examiner

*Primary Examiner* — Dao Phan
(74) *Attorney, Agent, or Firm* — McDermott Will & Emery LLP

(57) ABSTRACT

High precision radio frequency direction finding systems are described that can determine an angle-of-arrival and geo-location of a RF emitter with respect to a mobile platform. A radio frequency direction finding (RFDF) system for determining a position of a RF emitter with respect to a mobile platform can include an angle-of-azimuth (AoA) system configured to determine an azimuth of a RF emitter with respect to the mobile platform; an attitude measurement system configured to measure the attitude of the mobile platform; a geo-location system configured to calculate the geo-location of the RF emitter; and a processor system configured to calculate a position of the RF emitter.

20 Claims, 5 Drawing Sheets

HIGH PRECISION RADIO FREQUENCY DIRECTION FINDING SYSTEM

BACKGROUND

In some situations, it may be desirable to precisely determine the location of objects or devices that emit radio frequency energy such as radar pulses and communications signals. For example, military platforms, such as aeronautical vessels such airplanes, helicopters, and missiles as well as nautical vessels such as boats, often need to accurately locate threats that emit radio frequency energy. Working singly or in cooperation with another movable platform, a high precision radio frequency direction finding system can locate an RF emitter within a small enough volume of space to target and destroy the emitter with conventional or GPS guided weapons.

To target a threat emitter, it is desirable for military platforms to determine the location of a threat emitter within a volume smaller than a cube thirty meters (~100 ft) on a side. This can only be accomplished if the military platform can measure the emitter's angle of arrival to less than 0.1 degrees and the military platform's attitude with respect to earth coordinates is known to less than 0.1 degrees in roll, pitch and yaw. Usually, the local wind, ocean waves and other effects introduce enough uncertainty of the military platform's attitude so that the threat emitter geo-location uncertainty is too large to allow it to be targeted.

Aircraft based radio frequency direction finding (RFDF) systems are used by the military to detect and geo-locate radio frequency emissions of radars, commercial broadcast transmitters, data links and other communications transmitters. As shown in FIG. 1, a fixed or slowly moving RF emitter 102 can be geo-located using triangulation. The triangulation process can be accomplished simultaneously by using multiple dispersed ground-based or aircraft-based direction finding receivers, represented by planes 104-108. The triangulation process can alternatively be accomplished by flying a single direction finding receiver on a single aircraft, shown at different position 104-108, by the RF emitter and taking multiple RFDF measurements. Different angles of the aircraft at different positions are shown as $\theta_1$-$\theta_3$.

The geo-location measurement accuracy is dependent upon the accuracy of the true angle-of-arrival (AoA) measurement and the accuracy of the geo-location of the direction finding receivers. For example, if the AoA azimuth accuracy is less than 0.1°, the cross range error is less than 360 feet at a range of 40 statute miles. Multiple AoA measurements from different directions will locate the emitter inside an ellipse with major and minor axes of less than 360 feet. This is accurate enough to target the RF emitter with a weapon or direct an electro-optic sensor to look at the location, where the RF emitter or people nearby can be identified.

Obtaining high AoA accuracy from a moving aircraft or another military vehicle has proven to be difficult. The aircraft attitude uncertainty and motion can be much greater than 0.1°. Also, the installed accuracy of a typical RFDF system is between 1° and 5°. For example, the local wind, ocean waves and other effects can introduce enough uncertainty of the military platform's attitude so that the threat emitter geo-location uncertainty is too large to allow it to be targeted. In addition, the signal-to-noise ratio (SNR) in the receivers will determine the angular resolution uncertainty and the final accuracy of the AoA measurement.

An aircraft's attitude can be measured with an inertial navigation system, however, only the most expensive inertial navigation systems have the resolution to measure aircraft attitudes to less than 0.1 degrees. Inertial navigation systems have positional drift with time and need periodic updates to realign their position and attitude. Because of this reason and others, typical methods used today to attack radio emitters include the use of radio frequency homing weapons, such as the high speed anti-radiation missile (HARM), which homes in on a RF emitter. Examples of such missiles include air-to-ground, surface-to-surface, surface-to-air, and air-to-air types. Such missiles are typically very expensive.

SUMMARY

An aspect of the subject technology and present disclosure provides a radio frequency direction finding (RFDF) system for determining a position of a RF emitter with respect to a mobile platform. The system can include an angle-of-azimuth (AoA) system configured to determine an azimuth of a RF emitter with respect to the mobile platform; an attitude measurement system configured to measure the attitude of the mobile platform; a geo-location system configured to calculate the geo-location of the RF emitter; and a processor system configured to calculate a position of the RF emitter.

The AoA system can include a RF interferometer including an antenna array having a plurality of antennas or antenna array.

The RF interferometer can include a plurality of plurality of receivers, each connected to one of the plurality of antennas.

The RF interferometer can include a plurality of phase comparators, each connected to one of the plurality of receivers.

Each of the plurality of phase comparators can be connected to a unique pair of the plurality of receivers.

The interferometer can include or be used with a processor configured to implement the multiple signal classification (MUSIC) algorithm as an interferometry algorithm.

The attitude measurement system can include a differential global position system (GPS) for determining the attitude of the mobile platform.

The differential GPS system can be configured to determine the geo-location of the mobile platform.

The RFDF system can include or be used with a database of topological data, such a data concerning terrain adjacent or near the RF emitter(s).

The RFDF system can include a memory location including topological data.

The attitude measurement system can include an inertial navigation system for determining the attitude of the mobile platform.

The RFDF system can include one or more GPS receivers.

The RFDF system can include a built-in-test (BIT) system configured to align the interferometer.

The BIT system can be configured to provide test waveforms to the interferometer.

The AoA system can be configured to determine azimuth of the RF emitter utilizing phase measurements.

The AoA system can be configured to determine azimuth of the RF emitter utilizing amplitude measurements.

A further aspect of the subject technology and present disclosure can provide a radio frequency direction finding (RFDF) system for determining a position of a RF emitter with respect to a mobile platform. The system can include an interferometer including an antenna array configured to determine an azimuth of a RF emitter with respect to the mobile platform, wherein the antenna array is configured for implementation on the mobile platform. The system can include an attitude measurement system configured to measure the attitude of the mobile platform; a geo-location system configured to calculate the geo-location of the RF emitter; a geo-location system configured to calculate the geo-location of the mobile platform; and a processor system configured to calculate a position of the RF emitter with respect to the mobile platform.

The interferometer can include or be used with a processor configured to implement the multiple signal classification (MUSIC) algorithm as an interferometry algorithm.

The attitude measurement system can include an inertial navigation system for determining the attitude of the mobile platform.

The attitude measurement system can include a differential GPS system.

These, as well as other components, steps, features, objects, benefits, and advantages of the present disclosure, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
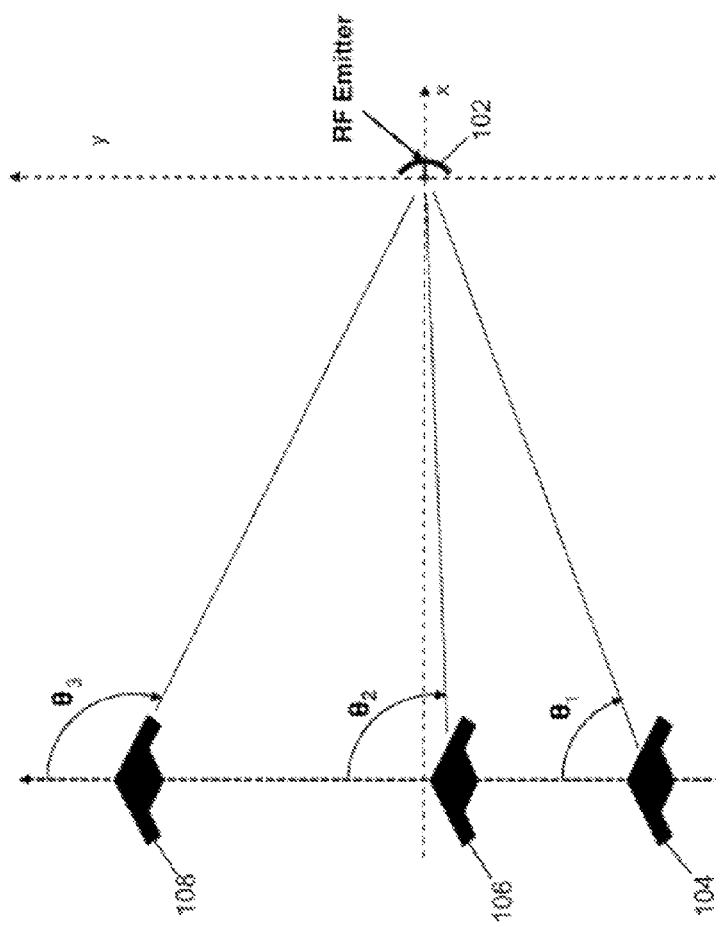
FIG. 1 depicts a diagram illustrating location of a RF transmitter through triangulation.

Of course, while certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Aspects of the subject technology, can accurately measure the geo-location of one or more RF emitters, and can include a RFDF system configured for operation onboard a mobile platform such as an aircraft, a GPS based system that can measure the platform's attitude accurately, and a computer or processing system that includes software that is functional to perform geometry computations and that is linked to or can access digital terrain data. Exemplary embodiments of the subject may be realized or facilitated by a calibrated radio frequency direction finding system and a differential GPS system that is configured to measure a movable platform's attitude with respect to Earth coordinates.

Figure 2:
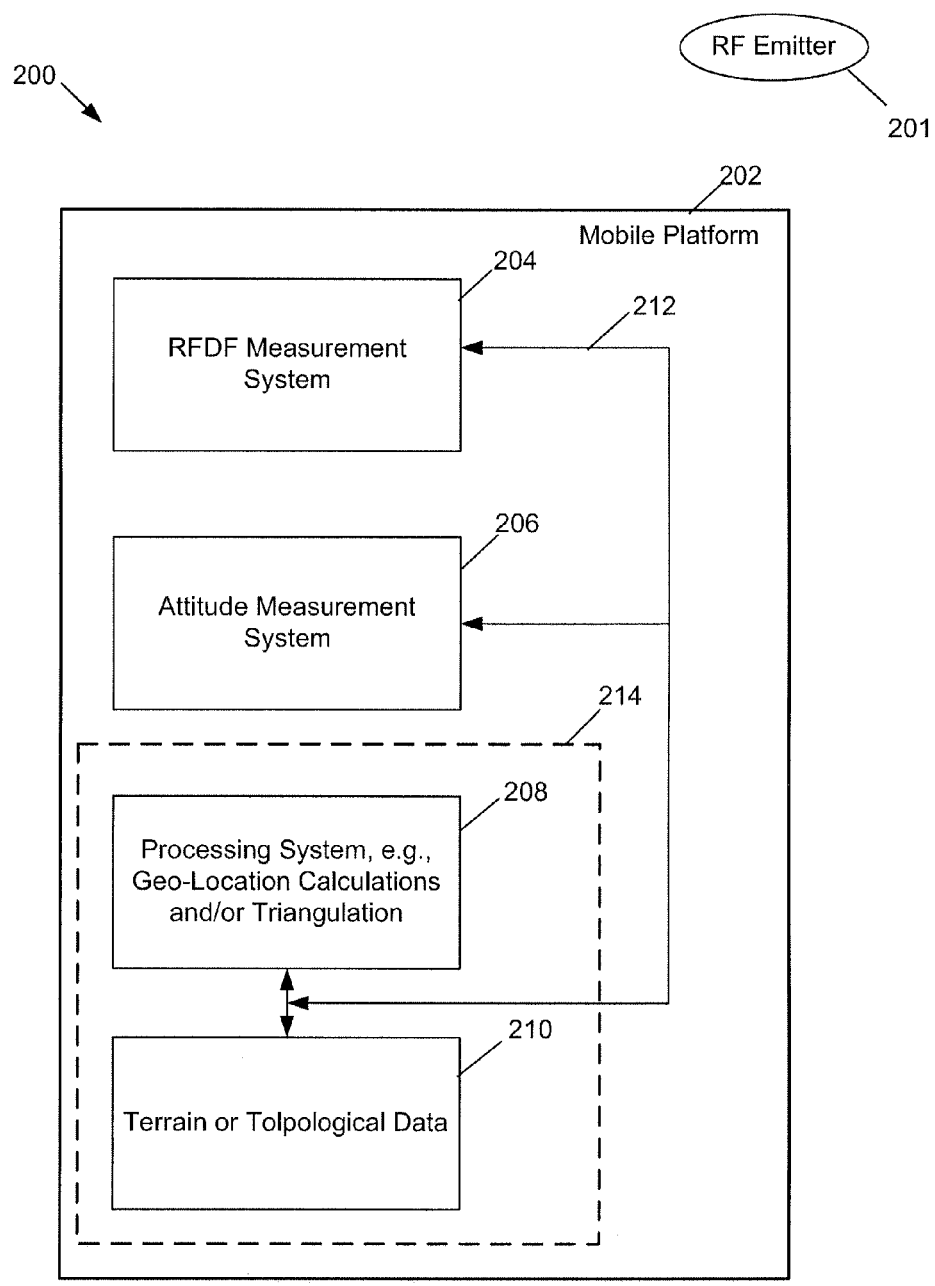
FIG. 2 depicts a block diagram of an example of a RFDF system according to the present disclosure.

FIG. 2 depicts an example of a high precision RFDF system 200 according to the subject technology. System 200 can be used to measure a position or location of a RF emitter, shown as 201, to within a desired accuracy or precision. System 200 can be located on or in a mobile platform 202, e.g., an aircraft such as a plane, balloon, or helicopter or the like. System 200 can include an azimuth direction-of-arrival (DoA), also referred to as angle-of arrival (AoA) system 204, e.g., an interferometer system, and an attitude measurement system 206 that is operable to measure the platform's attitude accurately or with a desired precision. System 200 can also include a computer system or processing system 208 that is configured (e.g., includes software) or is functional to perform geometry computations, e.g., triangulation computations, and that is linked to or can access digital terrain data, which may be in a database or memory location 210.

Processing system 208 can perform geo-location calculations to determine the geo-location of the RF emitter 201 and/or the mobile platform 202, and may be referred to as a geo-location systems. In some embodiments, a geo-location system (or component/sub-system of such) 208 may be present to determine the geo-location of the RF emitter 201 while another geo-location system (or component/sub-system of such) 208 may be present to determine the geo-location of the mobile platform 202. Suitable connections or buses 212 can connected components of system 200, as shown. The computer or processing system 208 and database or memory location including the digital terrain data 210 may be separate or may be co-located as shown at 214.

In operation, the system 200 onboard platform 202 can take high precision RFDF measurements and geo-locate non-cooperative ground based RF emitters, e.g., RF emitter 201, with high accuracy. This may be accomplished by the system 200 taking multiple azimuth RFDF measurements and performing triangulation computations. The triangulation computations can predict the range between the platform 202, e.g., aircraft, and the RF emitter 201. The RF emitter 201 is geo-located when the system 200 has determined the range and the bearing direction. Elevation of the RF emitter 201 can be determined as the RFDF system 200 can be calibrated at a specific elevation angle, based upon the altitude of the mobile platform 202, e.g., aircraft, and the height of the ground when the measurements are taken. The triangulation calculations can predict or determine the range of the RF emitter 202 from the mobile platform 202 based upon a number of azimuth angle measurements. The RFDF system 200 can be calibrated to the platform's azimuth and elevation angle reference system and to the earth's coordinates. As the RFDF can be calibrated at a given elevation angle, the platform's altitude and the digital terrain data can give a corrected elevation angle for the ground based emitter 201 based upon the platform's altitude and the RF emitter's range and bearing from the platform 202.

In some embodiments, the phase measurements of an interferometer can change a small amount with elevation angle—a phenomenon known as coning. The phase changes due to coning can be accounted for and the DoA measurements can be corrected. The coning corrections can correct an error for the range between the platform 202 and the RF emitter 201. With a few iterations through the geo-location computations, e.g., performed by processing system 208, the geo-location error can be reduced.

In exemplary embodiments, the RFDF system 200 onboard the mobile platform 202, e.g., aircraft, is calibrated prior to use. This may be accomplished by the platform 202 flying by a ground based transmitter with known geo-coordinates. As the platform 202, e.g., aircraft, flies by the ground based transmitter, the RFDF measurements made by system 200 are correlated with the earth based geometry coordinates. Knowing the platform's geo-location, altitude and attitude, and the ground based transmitter's geo-location, the true DoA, relative to the platform's azimuth and elevation angle can be computed. The computed DoA is then correlated with the measurements from the RFDF system 200. The platform can fly around the ground based transmitter until system 200 has collected data over all of the azimuth and elevation angles of interest, and over the frequency range of interest.

Figure 3:
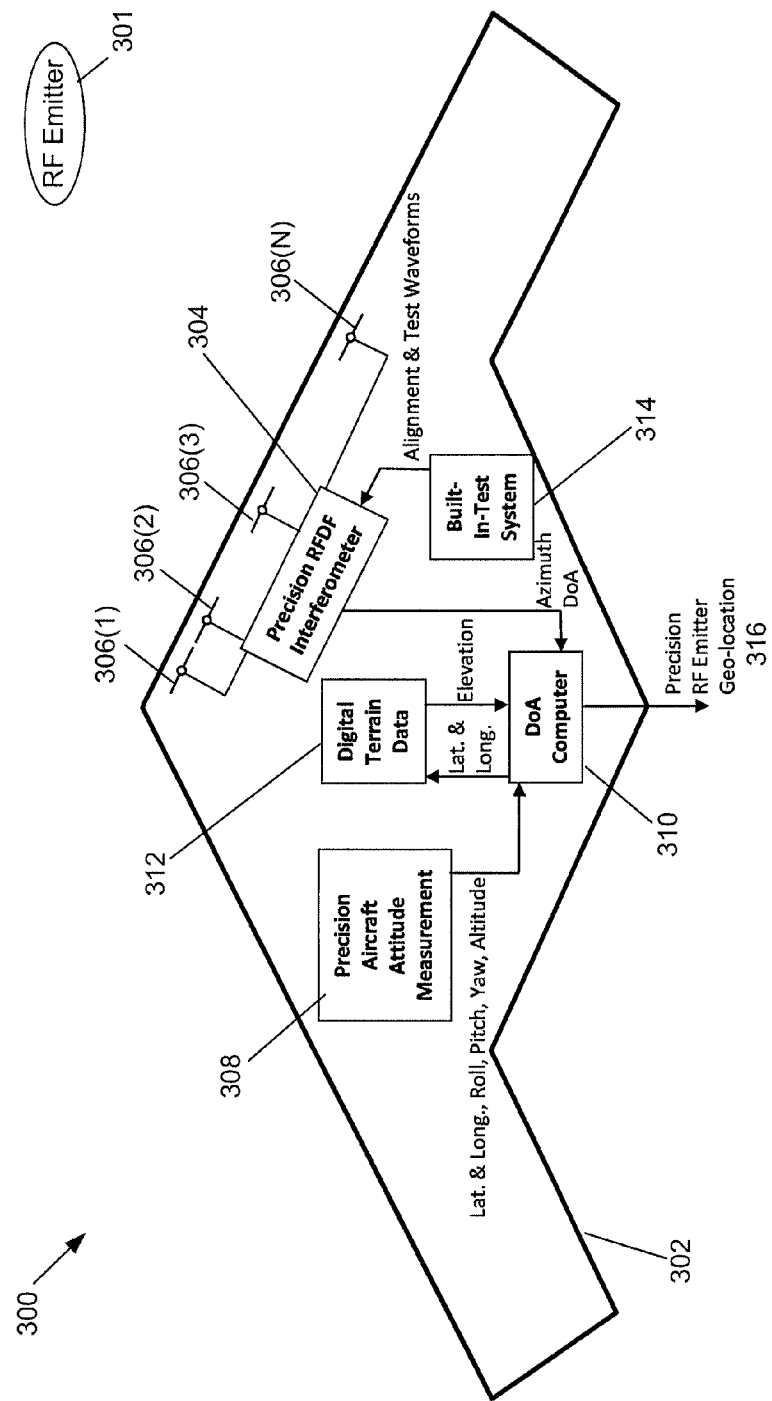
FIG. 3 depicts a simplified diagram of a RF location system including a number of subsystems, located on an aircraft, in accordance with an aspect of the present disclosure.

FIG. 3 depicts a simplified diagram of a RFDF location system 300 for determining a position of a RF emitter 301. System 300 includes a number of subsystems, located on an aircraft platform 302, in accordance with an aspect of the present disclosure. As shown in FIG. 3, exemplary embodiments of the subject technology can combine multiple electronic systems to achieve high precision AoA measurements of RF emitter location(s) from a mobile platform, e.g., on aircraft or on a variety of other military vehicles.

System 300 can include a calibrated high resolution azimuth direction-of-arrival (DoA) system, also referred to as angle-of arrival (AoA) system, for RFDF measurements, which can include an RFDF interferometer 304 having a number of antennas 306(1)-306(N) forming an antenna array. The antenna array may be configured for a desired location, e.g., leading wing edge(s), on the platform 302. Four antennas are shown at the leading edge of one wing, but any suitable number may be used and they may be placed at any suitable location(s) on the platform 302. The antennas 306(1)-306(N) may be used in conjunction with associated receivers or transceivers (not shown).

System 300 can also include high accuracy aircraft (or other military vehicle) attitude measurement system 308. Attitude measurement system 308 can determined or provide latitude, longitude, roll, pitch, yaw, and altitude of platform 302. System 300 can further include a high accuracy geo-location computer system 310 to calculate the geo-location of the RF emitter 301 using high accuracy triangulation measurements of the RF emitter(s). System 300 can also include a high accuracy digital terrain or topographical data, e.g., in a database or memory location 312 on board the aircraft 302 to get the ground elevation of the RF emitter 301 above sea level. System 300 can also include a built-it-test (B.I.T.) system 314 that is functional to keep the RFDF measurement system 300 aligned. The built-in-test system 314 can provide alignment and test waveforms to interferometer 304 and receivers 306(1)-306(N). In operation, system 300 can provide a precision RF emitter geo-location 316 corresponding to RF emitter 301.

The azimuth direction-of-arrival (DoA), also referred to as angle-of arrival (AoA), of a RF emission with respect to an aircraft, can be known with high resolution through a combination of phase and/or amplitude measurements. A multi-element interferometer compares the received phase in multiple antenna/receiver channel.

Figure 4:
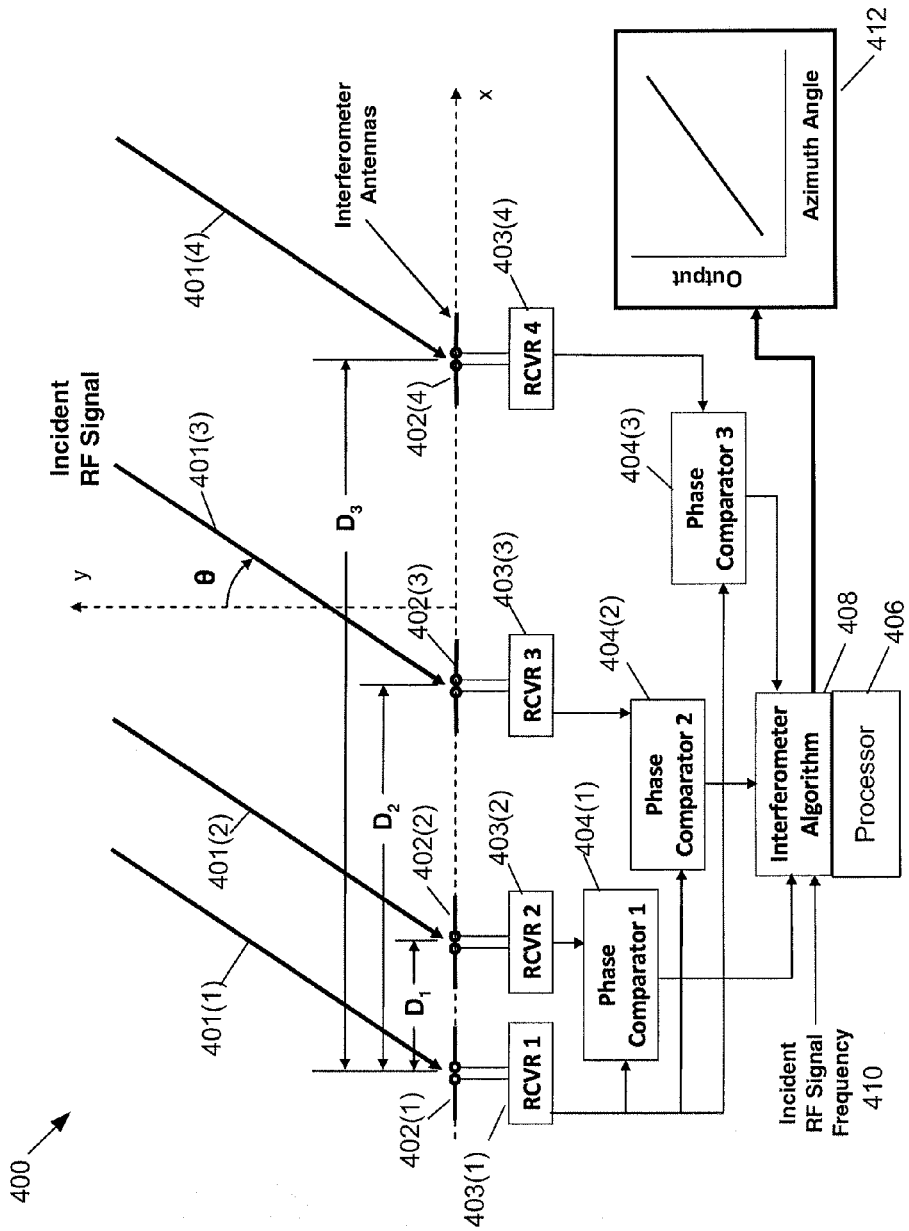
FIG. 4 depicts a diagram of a multi-element interferometer, in accordance with an aspect of the present disclosure.

FIG. 4 depicts a diagram of an example of a multi-element interferometer 400, in accordance with an aspect of the present disclosure. Interferometer 400 can receive incident RF signals 401(1)-401(4) from an RF emitter (not shown) at antennas 402(1)-402(4), as shown. Antennas 402(1)-402(4) can be connected to corresponding receivers 403(1)-403(4). Spacings or distances between the antennas 402(1)-402(4) are shown as $D_1$-$D_3$. Phase comparators 404(1)-404(3) are configured between indicated pairs of antennas 402(1)-402(4); other configurations for phase comparators may of course be utilized.

Continuing with the description of interferometer 400, the measured phases from the phased comparators 404(1)-404(3) and the incident RF signal frequency can be used to determine an azimuth angle to the RF emitter, e.g., θ, as shown. The measured phase and incident RF signal frequency can be processed by a processor 406 running a suitable interferometer algorithm 408. The processor 406 and algorithm 408 can provide an output signal 412 that indicates azimuth angle of the RF emitter. In some embodiments, the processor 406 and algorithm 408 can be included with or part of interferometer 400. In other embodiments, the processor 406 and algorithm 408 can be part of or included with a separate system, e.g., DoA computer 310 of FIG. 3.

In an interferometer, e.g., interferometer 400, the phase differences between the antenna elements are measured. The measured phases are put into an analog or digital processor, along with the incident RF signal frequency, which outputs a unique single value azimuth angle as a function of voltage or as digital numbers. The number of interferometer elements and the spacing between the elements is designed to give unambiguous DoA over a given angular space (e.g. θ=±60°) and over a given frequency range (e.g. 100 to 1000 MHz).; other frequencies may of course be used, e.g., any RF frequency, for example, K-band, Ka-band, Ku-band, X-band, etc.

The azimuth angular resolution is dependent upon the maximum spacing or base-leg ($D_3$ in FIG. 4) and the SNR in the receivers. The RMS (root mean square) angular accuracy of an interferometer in degrees is given by:

$$\sigma_\theta = (180\lambda)/(D_3 \cos(\theta)\pi^2 \text{SQRT}(\text{SNR}));\qquad [\text{EQ. 1}]$$

where λ is the wavelength in meters
$D_3$ is the maximum separation or base-leg in meters
θ is the angle from normal incidence of the interferometer array; and
SNR is the signal to noise ratio.

Figure 5:
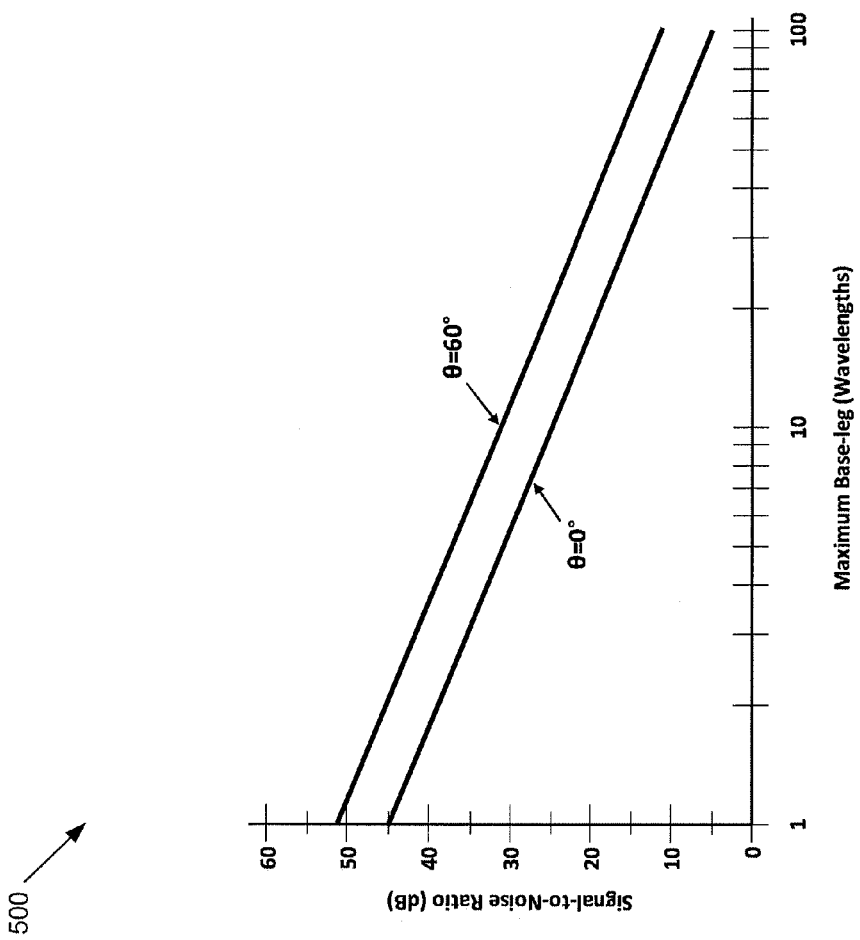
FIG. 5 depicts a performance graphs for an interferometer, in accordance with exemplary embodiments of the present disclosure.

FIG. 5 shows a plot 500 of separation distance and the SNR required to have a 0.1° angular accuracy for θ=0° and θ=60°. FIG. 5 shows that it will be more difficult to get accurate azimuth DoA measurements for lower frequency signals because the maximum possible electrical spacing of the interferometer array is limited by the size of the aircraft.

For example, if the RFDF measurement is taking place at 100 MHz, where the wavelength is three meters, the maximum possible base-leg on a fighter sized aircraft is about three wavelengths. Because an aircraft's electrical height is small in the VHF band, the elevation angle DoA for ground based emitters is derived. In the lower frequency VHF and UHF bands (100 to 500 MHz), the receivers will need to be designed to have a low noise figure to achieve the needed SNR.

Exemplary suitable interferometers and interferometer algorithms are described, e.g., "Ambiguity-Resistant Three and Four Channel Interferometers," Robert L. Goodwin, Sep. 9, 1976, Naval Research Laboratory Report #8005, the entire contents of which are incorporated herein by reference.

Further embodiments of suitable AoA measurement systems for RFDF systems can utilize use both received amplitude and phase to measure the DoA of an RF emitter.

Examples of such RFDF systems are based upon and/or utilize the MUSIC algorithm, which is commonly used in electronics warfare systems. This approach allows for a more flexible antenna location installation. The MUSIC (from "Multiple Signal Classification") algorithm uses amplitude measurements to eliminate ambiguities in the DoA measurements. A suitable system that measures the DoA based on the MUSIC algorithm is described in, e.g., "A Critical Study of a Self-Calibration Direction-Finding Method for Arrays," Harry Lee and Robert Stovall, IEEE Transactions on Signal Processing, Vol. 42 No. 2 Feb. 1994, pp 471-474, the entire contents of which are incorporated herein by reference.

The resolution and accuracy of an RFDF system can be reliant upon repeatable phase and amplitude measurements. The amplitude and phase behavior of electronics can change or drift with time and temperature and such changes can be large enough to give AoA uncertainties of greater than 1°. In exemplary embodiments, by adding B.I.T. circuitry, the drift in the electronics can be measured and corrected. This can be accomplished by injecting signals into the interferometer antenna ports and measuring the responses of interferometer circuits.

The installed accuracy of an interferometer is typically between 1° and 5°. The installed accuracy is less than ideal because there are amplitude and phase errors introduced by the installation. The amplitude and phase errors are due to the interaction between the antennas and the aircraft, and variation in the transmission lines that connect the antennas to the receivers. These errors can be calibrated out by flying the aircraft past a ground based transmitter, which has a known geo-location. The DoA accuracy will be dependent upon the uncertainty of the aircraft's geo-location (latitude, longitude and altitude) and the aircraft's attitude (roll, pitch and yaw).

In exemplary embodiments, a AoA measurement system or RFDF system may be utilized which uses the Global Positioning Satellites (GPS) to give the mobile platform's (aircraft) geo-location to an accuracy of about 10 meters. Examples of two suitable commercially available product types that give the aircraft's geo-location and attitude to sufficiently high accuracy include the following: (1) an RFDF/AoA system sold by Thales, which uses differential GPS to measure the aircraft's attitude; it is capable of measuring the aircraft's attitude to about 0.1°, and, (2) an inertial navigation system (INS) that is augmented with GPS receivers. There are several commercial GPS/INS systems and the Northrop Grumman LN-251 is one example. The LN-251 can measure the aircraft's attitude to less than 0.05°. A mobile platform, e.g., an aircraft, that is outfitted with such a GPS/INS system, can allow an interferometer to be calibrated to a sufficient accuracy that is based upon the aircraft's geo-location and attitude error, the interferometer base-leg, and the receiver SNR, to determine the location (which may be moving) of one or more RF emitters with desired precision.

Accordingly, aspects of the subject technology can allow a mobile platform, such as aircraft, to measure AoA of an incoming RF signal to high accuracy, accurately determine the geo-location and attitude (roll, pitch and yaw) of the platform with respect to Earth's coordinates, and have high accuracy topographical data, so that the platform (e.g., aircraft) can locate the earth coordinates of the RF emitter with high accuracy.

The components, steps, features, benefits and advantages that have been discussed herein are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

In reading the present disclosure, one skilled in the art will appreciate that embodiments of the present disclosure can be implemented in hardware, software, firmware, or any combinations of such, and over one or more networks. Suitable software can include computer-readable or machine-readable instructions for performing methods and techniques (and portions thereof) of the subject technology. Any suitable software language (machine-dependent or machine-independent) may be utilized. Moreover, embodiments of the present disclosure can be included in or carried by various signals, e.g., as transmitted over a wireless RF or IR communications link or downloaded from the Internet.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A radio frequency direction finding (RFDF) system for determining a position of a RF emitter with respect to a mobile platform, the system comprising:
    an angle-of-azimuth (AoA) system configured to determine an azimuth of a RF emitter with respect to the mobile platform, wherein the AoA system comprises a RF interferometer;
    an attitude measurement system configured to measure the attitude of the mobile platform;
    a geo-location system configured to calculate the geo-location of the RF emitter;
    a processor system configured to calculate a position of the RF emitter; and
    an alignment system configured to align the RF interferometer.

2. The RFDF system of claim 1, wherein the RF interferometer comprises an antenna array having a plurality of antennas.

3. The RFDF system of claim 2, wherein the RF interferometer comprises a plurality of receivers, each connected to one of the plurality of antennas.

4. The RFDF system of claim 2, wherein the RF interferometer comprises a plurality of phase comparators, each connected to one of the plurality of receivers.

5. The RFDF system of claim 3, wherein each of the plurality of phase comparators is connected to a unique pair of the plurality of receivers.

6. The RFDF system of claim 2, wherein the interferometer comprises a processor configured to implement the multiple signal classification (MUSIC) algorithm as an interferometry algorithm.

7. The RFDF system of claim 1, wherein the attitude measurement system comprises a differential global position system (GPS) for determining the attitude of the mobile platform.

8. The RFDF system of claim 7, wherein the differential GPS system is configured to determine the geo-location of the mobile platform.

9. The RFDF system of claim 1, further comprising a database of topological data.

10. The RFDF system of claim 1, further comprising a memory location including topological data.

11. The RFDF system of claim 1, wherein the attitude measurement system comprises an inertial navigation system for determining the attitude of the mobile platform.

12. The RFDF system of claim 1, further comprising one or more GPS receivers.

13. The RFDF system of claim 1, wherein the alignment system comprises a built-in-test (BIT) system configured to align the RF interferometer.

14. The RFDF system of claim 1, wherein the alignment system is configured to provide test waveforms to the RF interferometer.

15. The RFDF system of claim 1, wherein the AoA system is configured to determine azimuth of the RF emitter utilizing phase measurements.

16. The RFDF system of claim 15, wherein the AoA system is further configured to determine azimuth of the RF emitter utilizing amplitude measurements.

17. A radio frequency direction finding (RFDF) system for determining a position of a RF emitter with respect to a mobile platform, the system comprising:
an interferometer including an antenna array configured to determine an azimuth of a RF emitter with respect to the mobile platform, wherein the antenna array is configured for implementation on the mobile platform;
an attitude measurement system configured to measure the attitude of the mobile platform;
a geo-location system configured to calculate the geo-location of the RF emitter;
a geo-location system configured to calculate the geo-location of the mobile platform;
a processor system configured to calculate a position of the RF emitter with respect to the mobile platform; and
an alignment system configured to align the interferometer.

18. The RFDF system of claim 17, wherein the interferometer comprises a processor configured to implement the multiple signal classification (MUSIC) algorithm as an interferometry algorithm.

19. The RFDF system of claim 17, wherein the attitude measurement system comprises an inertial navigation system for determining the attitude of the mobile platform.

20. The RFDF system of claim 17, wherein the attitude measurement system comprises a differential GPS system.

* * * * *